Dec. 11, 1962     A. R. PERRINS     3,068,395
AUTOMATIC VOLTAGE REGULATOR
Filed Jan. 20, 1959
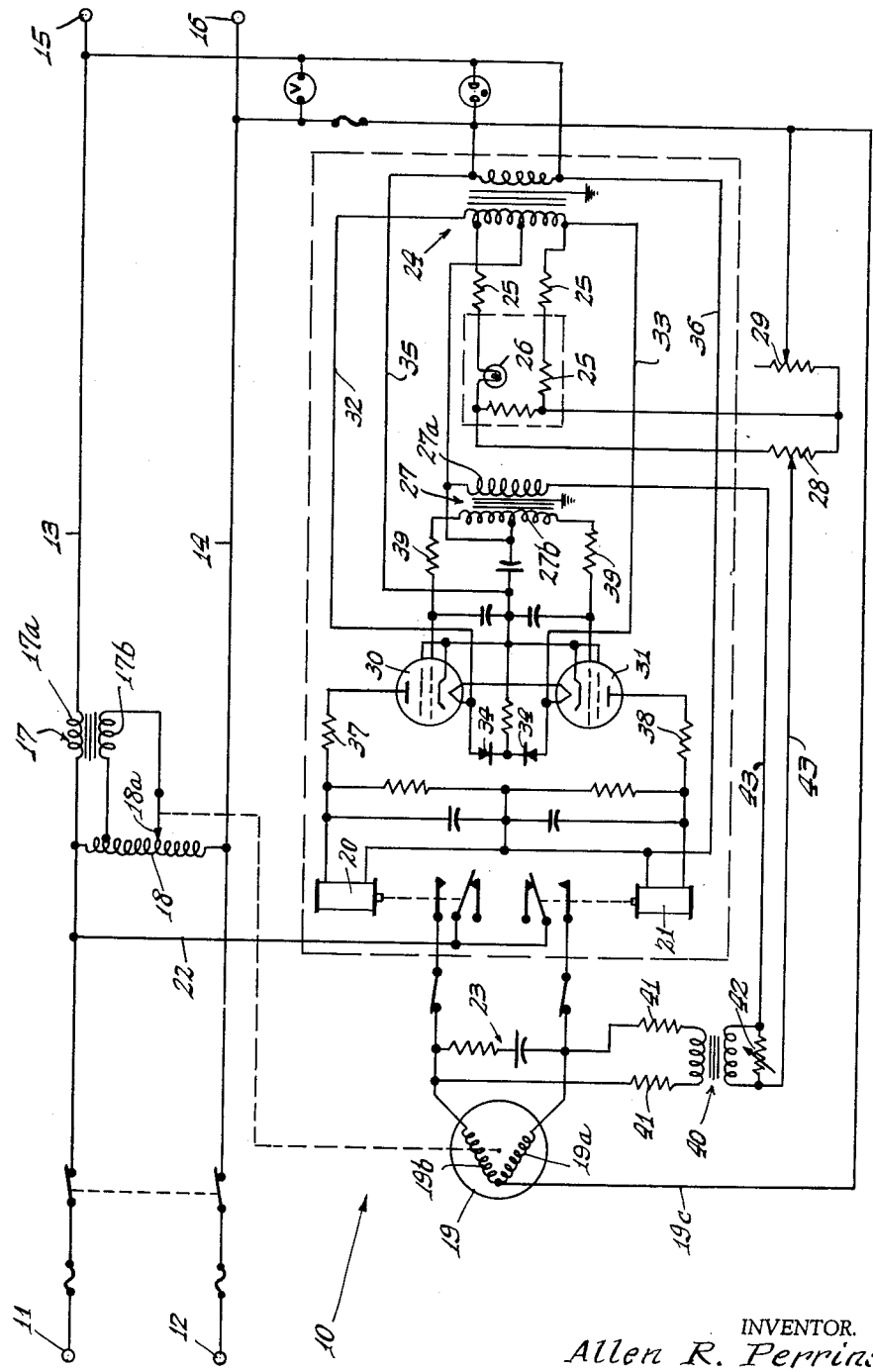
INVENTOR.
*Allen R. Perrins*
BY
*Johnson and Kline*
ATTORNEYS

United States Patent Office

3,068,395
Patented Dec. 11, 1962

---

3,068,395
AUTOMATIC VOLTAGE REGULATOR
Allen R. Perrins, Cheshire, Conn., assignor to The Superior Electric Company, Bristol, Conn., a corporation of Connecticut
Filed Jan. 20, 1959, Ser. No. 787,879
4 Claims. (Cl. 323—45)

The present invention relates to a regulator for automatically producing a substantially constant output voltage and more particularly to a regulator of the discontinuous control type.

One type of discontinuous control regulator employs a reversible electric motor that adjusts a variable impedance or, as in the hereinafter described embodiment of the invention, a variable transformer to regulate the output voltage. The energization of the motor to maintain constant the output voltage is determined by the deviation of the output voltage from a preselected value; however the output voltage may vary within a small range about the preselected value without the motor being energized to cause correction.

The size of the range determines the sensitivity of the regulator and attempts to increase the sensitivity by decreasing the size of the range have not been successful because of the substantial increase in the degree of "hunting" of the regulator as it attempts to find the correct position that produces an output voltage falling within a small range. Moreover while "hunting" may be somewhat decreased by decreasing the speed of the regulator in responding to correct a deviation in the output voltage, this is undesirable since ideally the speed of response should be instantaneous.

An object of the present invention is to provide an automatic voltage regulator having an increased sensitivity.

Another object of the instant invention is to provide in an automatic voltage regulator of the above type for substantially lessening the amount of "hunting" of the regulator even with an increase in sensitivity.

A further object of the present invention is to provide an automatic voltage regulator which accomplishes the above objects even with a faster speed of response than has heretofore been possible.

In achieving the above objects, the automatic voltage regulator of the present invention specifically includes an adjustable autotransformer to provide for the regulation of the output voltage. The autotransformer is driven by a reversible electric motor having one circuit which effects an increase in the output voltage and another circuit which effects a decrease in the output voltage. To detect deviation of the output voltage from a preselected value, there is provided a sensing circuit which produces a signal indicative of the direction and magnitude of the deviation and this signal is fed to a control circuit which energizes one or the other of the motor circuits. Since the control circuit functions merely as a switching circuit and energizes the motor whenever the signal from the sensing circuit is of a preselected magnitude, the motor is energized at full speed and not proportionally to the value of the signal and remains so until the signal from the sensing circuit decreases below the preselected magnitude when it causes the control circuit to deenergize the motor. However, the inertia of the motor and also the finite response of the other parts of the circuit particularly the sensing circuit, since they do not function instantaneously, cause the motor to continue in motion and to overshoot the preselected value of the output voltage. This causes the sensing and control circuits to energize the motor in the reverse direction to bring the output voltage back to within the sensitivity range of the regulator.

To overcome this "hunting," and also to increase the sensitivity the present invention provides for altering the signal to the control circuit from the sensing circuit to synthesize on the control circuit a condition in which the output voltage is indicated as being closer to the preselected value than it actually is, thereby compensating for the inertia of the system so that when the motor is deenergized it comes to rest with the output voltage being substantially at the preselected value.

The synthesizing of the condition is accomplished according to the present invention by producing a signal whenever the motor is energized that opposes the sensing signal. Since the sensing signal may be in either direction and the opposing signal must always be opposing and in addition the opposing signal should only be present when the motor is energized, the opposing signal is efficiently and effectively obtained from one or the other of the energizing circuits of the motor. The value of the opposing signal is less than the preselected magnitude of the sensing signal that effects the control circuit and is preferably adjustable to enable selection of its most efficient value for each regulator.

Other features and advantages will hereinafter appear.

The only FIGURE is an electrical schematic diagram of an automatic voltage regulator including the present invention.

Referring to the drawing, the regulator is generally indicated by the reference numeral 10 and has a pair of input terminals 11 and 12 and leads 13 and 14 connected thereto and to a pair of output terminals 15 and 16. Positioned in the lead 13 is a winding 17a of a transformer 17 while positioned across the leads 13 and 14 is a tapped adjustable autotransformer 18 whose output is connected to another winding 17b of the transformer 17. By this well-known arrangement, adjustment of the voltage from the autotransformer bucks and boosts the voltage across the leads 13 and 14 to produce an output voltage having a preselected value. It will be appreciated that, if desired, the output could be obtained directly from the output of the autotransformer since the invention is not to be considered as limited solely to a "buck-boost" regulator.

Mechanically connected to the brush 18a of the autotransformer is a reversible electric motor 19 with the connection being schematically indicated by the dotted line. The motor 19 has two windings 19a and 19b and a common lead 19c connected to a lead 14. The windings 19a and 19b are associated with normally open relays 20 and 21 with relay 20 controlling in-phase energization of the winding 19b while relay 21 controls in-phase energization of the winding 19a. Current through the relays to the winding is supplied from the lead 22 connected to the lead 13. In this type of motor when one winding is energized by its associated relay with in-phase voltage, the other winding is energized with out-of-phase voltage through the phase changing circuit 23 even though its associated relay is open. The direction of rotation depends upon which winding is in-phase energized and thus closing of one relay with the other being open causes rotation of the motor in one direction while a reverse position of the relays causes rotation in the other direction.

In order to provide energization of either relay and hence the motor when the output voltage varies from the preselected value, the regulator includes a sensing circuit comprising a transformer 24 and resistances 25 and a tungsten lamp 26 forming a voltage sensing bridge with the output of the bridge being fed to a winding 27a of a transformer 27. In addition there is provided a pair of variable resistances 28 and 29. The elements are connected in the manner shown so that the primary of the transformer 24 is across the output terminals. The variable resistance 28 is employed to adjust the balance point of the bridge thereby enabling selection of the output voltage which is to be maintained substantially constant while the variable resistance 29 is used to increase the sensitivity of the control circuit.

The sensing circuit produces a signal across the winding 27a which may be either in-phase or 180° out-of-phase with the output voltage depending upon the direction of deviation of the output voltage from the preselected value while the magnitude of the signal depends upon the amount of the deviation.

The signal in the winding 27a is fed to a control circuit for energizing the relays 20 and 21; this includes a pair of thyratron tubes 30 and 31 whose grids are connected to the secondary winding 27b of the transformer 27 to impress the signal thereon. A pair of leads 32 and 33 connected to the secondary winding of the transformer 24 supply energization to the heaters of the thyratron tubes and through the rectifiers 34 produce a negative potential on the cathodes and the suppressor grids. A lead 35 is connected to one end of the primary winding of the transformer 24 and to the cathodes while a lead 36 is connected to the other end of the primary winding 24 and to the relays 20 and 21. The plate of the thyratron tube 30 is connected through a resistance 37 to the relay 20 and similarly the plate of the thyratron tube 31 is connected through to a resistance 38 to the relay 21. It will thus be appreciated that upon conduction of either thyratron tube, energy flows through the lead 35 through the conducting thyratron, the relay associated with the thyratron and back to the lead 36 to energize and close the relay.

The thyratrons are normally biased in the circuit beyond cutoff so that they are non-conducting and a signal of a predetermined magnitude and phase is required on the grid to cause conduction in the tube as is well known in the art.

In the operation of the regulator should the voltage be lower than the preselected value, it is required that brush 18a move downwardly to add boosting voltage into the line 13 through the transformer 17. Movement of the brush is caused by in-phase energization of the winding 19a which requires that relay 21 be closed by being energized which occurs when the thyratron 31 is conducting. This is accomplished by the sensing circuit on which the output voltage is impressed producing a signal which has a magnitude and direction that, when impressed on the grid on the thyratron tube 31, causes it to fire.

Conversely if the signal from the sensing circuit is of the other phase and of the predetermined magnitude caused by the output voltage being higher than the preselected value, the tube 30 becomes conducting by reason of the signal being impressed on its grid which causes the relay 20 to be energized, effecting movement of the brush 18a upwardly by reason of the motor 19 being energized in the reverse direction.

The magnitude of the signal from the sensing bridge is proportional to the deviation of the output voltage from the preselected value and the thyratrons are biased sufficiently beyond cutout so that the signal has to have a predetermined magnitude in either direction before it renders the tubes conducting. Thus there is a range of output voltages between the exact preselected value of output voltage and a value above and below this preselected value in which the signal from the sensing circuit is insufficient to cause conductance of the tubes. This may be referred to as the sensitivity range of the regulator.

In operation, whenever the output voltage is outside the sensitivity range, the motor is energized and as soon as the output voltage is within the sensitivity range the motor becomes deenergized. It will be appreciated, however, that while the sensitivity range should be as small as possible, the motor is either fully energized or deenergized and thus the motor to correct even a small change in output voltage will exhibit its full inertial torque. Also the other components of the regulator do not function instantaneously and the delay between the stopping of the motor and the output voltage produced thereat may cause overcorrection of the output voltage so that it may be on the other side of the sensitivity range which necessitates reenergization of the motor in the opposite direction.

According to the present invention, however, a synthesized signal is impressed on the thyratron tubes and this signal will have a magnitude that renders the thyratron tube non-conducting when the output voltage approaches but is not quite within the sensitivity range thereby compensating for the inertia of the motor and the delay in the other components. This synthesized condition is formed by introducing to the control circuit a signal that always opposes the signal from the sensing circuit irrespective of the direction of the sensing circuit signal, and thus decreases the magnitude of the signal impressed on the thyratron tubes.

To this end, there is provided a transformer 40 having its primary winding through two resistances 41 connected across the leads to the windings 19a and 19b of the motor. A resistor 42 which is variable is connected across the secondary winding of the transformer 40 while leads 43 connect one end of the resistance 42 to one end of the winding 27a while the other end of resistance 42 is connected to the resistance 28. Accordingly the signal to the control circuit will include the signal from the sensing circuit and algebraically added thereto, the signal produced across the resistance 42. By connecting the windings of the transformer 40 in the manner shown, it will be appreciated that unless the motor is energized, there is no voltage produced across the resistance 42 but whenever the motor is energized a signal is produced. If the motor is energized by in-phase energization of the winding 19b, the voltage across resistance 42 will be out-of-phase with the signal from the sensing circuit in the winding 27a and thus these two signals will be in opposition. Similarly whenever the winding 19a is energized with the in-phase voltage, the voltage across the resistance 42 will be reversed as will the signal across the winding 25b from the sensing bridge and thus there will still be opposition between the two signals. The magnitude of the signal which opposes the signal from the sensing bridge is set by the resistance 42, depending upon the inertia of the system to reduce the sensing bridge signal to its predetermined magnitude slightly before the output voltage reaches the preselected value. In this manner the inertia of the system is prevented from carrying the output voltage out of the sensitivity range. While the opposing signal from the resistance opposes the signal from the sensing bridge, it is not necessary that it directly oppose it, it being sufficient that it have a resulting component which decreases the magnitude of the sensing bridge signal.

While there has been disclosed a thyratron operated control circuit, it will be appreciated that other relay actuating circuits may be employed, such as a transistorized circuit. Also while the sensing bridging is A.C. energized to produce an in-phase and out-of-phase signal it is well within the scope of the invention to provide a D.C. energized bridge as is well known in the art and to oppose the D.C. signal therefrom.

It will accordingly be appreciated that there has been disclosed an automatic voltage regulator in which the present invention is incorporated that enables an increase in the sensitivity of the regulator even with an increased speed of response of the regulator. In addition while the sensitivity and speed of response are increased the "hunting" is decreased since the inertia of the system is compensated for by varying the value of the signal to the motor energizing control means.

Variations and modifications may be made within the scope of the claims and portions of the improvements may be used without others.

I claim:
1. An automatic voltage regulator comprising input terminals, output terminals, means connected between the terminals for regulating the output voltage and including an electric motor having one circuit which when energized causes the output voltage to increase and a second circuit which when energized causes the output voltage to decrease, sensing means connected to the output terminals for sensing the deviation of the output voltage from a preselected value and producing a signal indicative of the direction and magnitude of the deviation, control means connected to receive the signal from the sensing means and energize one or the other of the two circuits of the motor and means connected to the motor circuits for producing a signal which opposes the signal produced by the sensing means only when one or the other of the motor circuits is energized, said opposing signal being produced simultaneously with the energization of the motor circuit and being maintained at a constant value only while the motor circuit is energized.

2. An automatic voltage regulator comprising input terminals, output terminals, means connected between the terminals for regulating the output voltage and including an electric motor having one circuit which when energized causes the output voltage to increase and a second circuit which when energized causes the output voltage to decrease, sensing means connected to the output terminals for sensing the deviation of the output voltage from a preselected value and producing a signal indicative of the direction and magnitude of the deviation of the output voltage from the preselected value, control means connected to receive the signal from the sensing means and energize one or the other of two circuits of the motor and means connected to the motor circuits for producing a signal opposing the signal produced by the sensing means only when one of the motor circuits is energized, said opposing signal being produced simultaneously with the energization of the motor circuit and being maintained at a constant value only while the motor circuit is energized.

3. An automatic voltage regulator comprising input terminals, output terminals, means connected between the terminals for regulating the output voltage and including an electric motor having one circuit which when energized causes the output voltage to increase and a second circuit which when energized causes the output voltage to decrease, sensing means connected to the output terminals for sensing the deviation of the output voltage from a preselected value and producing a signal indicative of the direction and magnitude of the deviation of the output voltage from the preselected value, control means connected to receive the signal from the sensing means and energize one or the other of two circuits of the motor, means connected to the motor circuits and the control means for producing a signal which opposes the signal produced by the sensing means, said opposing signal being produced simultaneously with the energization of the motor circuit and being maintained at a constant value only while the motor circuit is energized and means for adjusting the value of the opposing signal.

4. An automatic voltage regulator comprising input terminals, output terminals, means connected between the terminals for regulating the output voltage and including an electric motor having one circuit which when energized causes the output voltage to increase and a second circuit which when energized causes the output voltage to decrease, said circuits being unenergized when the output voltage is at the desired value, sensing means connected to the output terminals for sensing the deviation of the output voltage from a preselected value and producing a signal indicative of the direction and magnitude of the deviation of the output voltage from the preselected value, control means connected to receive the signal from the sensing means and energize one or the other of two circuits of the motor, means connected to the motor circuits for producing a signal only when either one of the motor circuits is energized, said signal being in opposition to the sensing means signal and means for connecting the motor circuit signal to the control and sensing means to have the algebraic sum of the two signals received by the control means.

References Cited in the file of this patent

UNITED STATES PATENTS

| | | |
|---|---|---|
| 2,313,921 | Carlin et al. | Mar. 16, 1943 |
| 2,525,489 | Jolly | Oct. 10, 1950 |
| 2,619,630 | Stone | Nov. 25, 1952 |
| 2,725,522 | Murray et al. | Nov. 29, 1955 |
| 2,886,755 | Ehret et al. | May 12, 1959 |